May 15, 1923.

F. BUCK

JOINT FOR FOLDING RULES

Filed Nov. 15, 1919

1,455,042

INVENTOR
Fred Buck
By Jay, Oberlin & Jay,
ATTORNEYS.

Patented May 15, 1923.

1,455,042

UNITED STATES PATENT OFFICE.

FRED BUCK, OF SAGINAW, MICHIGAN, ASSIGNOR TO THE LUFKIN RULE COMPANY, OF SAGINAW, MICHIGAN, A CORPORATION OF MICHIGAN.

JOINT FOR FOLDING RULES.

Application filed November 15, 1919. Serial No. 338,257.

*To all whom it may concern:*

Be it known that I, FRED BUCK, a citizen of the United States, and a resident of Saginaw, county of Saginaw, and State of Michigan, have invented a new and useful Improvement in Joints for Folding Rules, of which the following is a specification, the principle of the invention being herein explained and the best mode in which I have contemplated applying that principle, so as to distinguish it from other inventions.

The present invention, relating, as indicated, to joints for folding rules, is directed to an improved joint of extremely simple and inexpensive construction which may be used to connect the various sections of folding rules. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
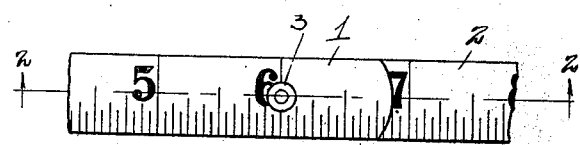
Figure 2:
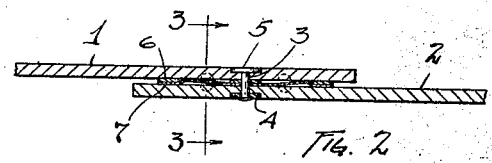
Figure 3:
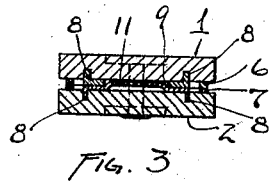
Figure 4:
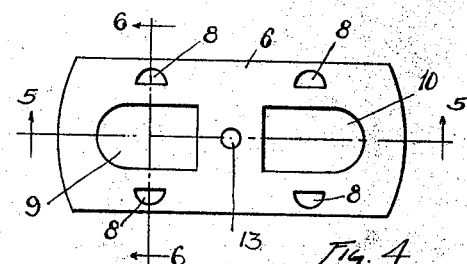
Figure 5:
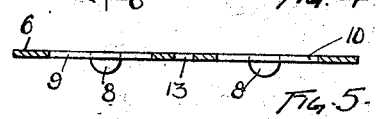
Figure 6:
Figure 7:
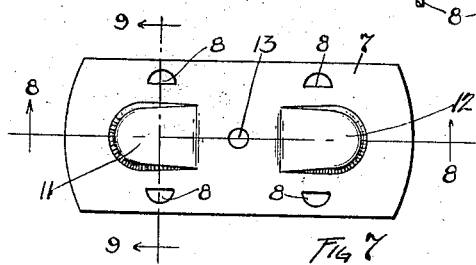
Figures 8, 9:
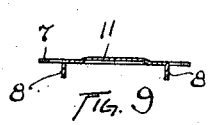

Fig. 1 is a side elevation showing the portion of a folding rule in which my improved joint is incorporated; Fig. 2 is a section on the line 2—2, Fig. 1; Fig. 3 is a section on the line 3—3, in Fig. 2; Fig. 4 is a plan view of one of the joint members or plates; Fig. 5 is a section on the line 5—5, Fig. 4; Fig. 6 is a section on the line 6—6, Fig. 4; Fig. 7 is a plan view of the other of the two joint members or plates; Fig. 8 is a section on the line 8—8, Fig. 7; and Fig. 9 is a section on the line 9—9, Fig. 7.

In Fig. 1 I have shown the sections 1 and 2 of a folding rule which are pivoted to swing about the same axis, which is in the form of a stud 3 engaged in suitable registered openings in the two rule sections, these openings being provided with enlarged recesses at either end in order to permit the head members 4 and 5 of the stud 3 to be inset level with the surface of the rule.

The joint members are in the form of thin rectangular metal plates 6 and 7, which are attached to the two rule sections 1 and 2, respectively. Each of these two members is provided with a series of sharp up-standing engaging lugs 8 which are pressed from the body of the plate members and are forced into the wood as the plate is pressed against the surface thereof. These lugs serve to securely engage the two plates on the rule sections. The member 6 is provided with two openings 9 and 10 of the form shown, while the member 7 is provided with two similarly disposed raised portions 11 and 12. These raised portions are slightly resilient and are sufficiently so to permit them to spring into the recesses or openings 9 and 10 in the other plate 6, while at the same time allowing these raised portions to rotate over the members of the surface 6 when the two rule portions are pivoted with respect to each other. The projections and recesses thus serve to exert a sufficient force to normally maintain the rule sections in alignment, either extending or side by side, and at the same time exert a sufficient frictional action to hold the sections in any angular relation in which they may be placed.

The members 6 and 7 are provided with central openings 13, which are aligned with the openings through the sections 1 and 2 for the reception of the stud 3.

The advantage of my improved joint is that it avoids the necessity for beveling off the ends of the rule sections, as is the case with the standard joint now in use, and also makes it unnecessary to recess the adjacent faces of the sections for the purpose of insetting the members. There is of course the slight disadvantage that a rule constructed with my joints is slightly thicker than a rule with inset joint members, but this disadvantage is very slight and is greatly outweighed by the greater simplicity and cheapness of the present joint.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

In a device of the character described, the combination of two overlapping rule sections, plates of lesser width than said sections mounted between the adjacent faces thereof at the respective ends of said sections, a pair of lugs pressed outwardly at right angles to the plane of each plate at points spaced from the side edges centrally of each half thereof, a stud holding each of said plates in engagement with its respective rule section, and serving as a pivot for said rule sections, one of said plates being provided on each side of said pivot with an upwardly pressed resilient projection lying at an acute angle to the plane of said plate and having a beveled outer edge of semi-circular shape formed integrally with said plate, and the other of said plates having a pair of openings of a shape corresponding with said projections, and similarly spaced, to receive said projections when said rule sections are in open or closed position.

Signed by me, this 11th day of November, 1919.

FRED BUCK.